United States Patent
Budagavi et al.

(10) Patent No.: US 8,885,714 B2
(45) Date of Patent: Nov. 11, 2014

(54) METHOD AND SYSTEM FOR INTRACODING IN VIDEO ENCODING

(75) Inventors: Madhukar Budagavi, Plano, TX (US); Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 388 days.

(21) Appl. No.: 12/982,482

(22) Filed: Dec. 30, 2010

(65) Prior Publication Data

US 2011/0170594 A1    Jul. 14, 2011

Related U.S. Application Data

(60) Provisional application No. 61/295,075, filed on Jan. 14, 2010, provisional application No. 61/295,911, filed on Jan. 18, 2010.

(51) Int. Cl.
| | |
|---|---|
| H04N 7/12 | (2006.01) |
| H04N 19/159 | (2014.01) |
| H04N 19/61 | (2014.01) |
| H04N 19/593 | (2014.01) |
| H04N 19/176 | (2014.01) |
| H04N 19/122 | (2014.01) |

(52) U.S. Cl.
CPC ... *H04N 19/00218* (2013.01); *H04N 19/00781* (2013.01); *H04N 19/00763* (2013.01); *H04N 19/00278* (2013.01); *H04N 19/00084* (2013.01)
USPC ................. 375/240.13; 375/240.12

(58) Field of Classification Search
CPC .................. H04N 19/00084; H04N 19/00278; H04N 19/00763; H04N 19/00781; H04N 19/00218; H04N 7/50; H04N 7/26244; H04N 7/26031; H04N 7/26271; H04N 7/26015; H04N 19/00; H04N 19/00569; H04N 19/00696
USPC .......................... 375/240.13, 240.12, 240.22, 375/240.14–240.29, 240.01–240.09
See application file for complete search history.

(56) References Cited

U.S. PATENT DOCUMENTS

| | | | |
|---|---|---|---|
| 6,593,925 B1 * | 7/2003 | Hakura et al. | 345/426 |
| 6,618,442 B1 * | 9/2003 | Chen et al. | 375/240.2 |
| 7,676,106 B2 * | 3/2010 | Panusopone et al. | 382/250 |
| 7,890,313 B2 * | 2/2011 | Kita et al. | 703/11 |

(Continued)

OTHER PUBLICATIONS

Egner et al, Automatic Derivation and Implementation of Signal Processing Algorithms, Jun. 2001.*

(Continued)

*Primary Examiner* — Andy Rao
*Assistant Examiner* — Shan Elahi
(74) *Attorney, Agent, or Firm* — Mirna Abyad; W. James Brady; Frederick J. Telecky, Jr.

(57) ABSTRACT

A method of intra-coding blocks of pixels in a digital video sequence is provided that includes selecting a block transform of a plurality of block transforms according to a spatial prediction mode used in generating a block of pixel residual values from a block of pixels, wherein the block transform is based on a single directional transform matrix predetermined for the spatial prediction mode and is a same size as the block of pixel values, applying the block transform to the block of pixel residual values to generate transform coefficients of the residual pixel values, and entropy coding the generated transform coefficients.

17 Claims, 8 Drawing Sheets

(56) References Cited

U.S. PATENT DOCUMENTS

| | | | | |
|---|---|---|---|---|
| 8,432,968 | B2* | 4/2013 | Ye et al. | 375/240.12 |
| 8,442,338 | B2* | 5/2013 | Liu et al. | 382/251 |
| 8,553,777 | B2* | 10/2013 | Yin et al. | 375/240.16 |
| 2004/0013195 | A1* | 1/2004 | Panusopone et al. | 375/240.2 |
| 2005/0232357 | A1* | 10/2005 | Hubrich et al. | 375/240.16 |
| 2008/0260030 | A1 | 10/2008 | Karczewicz | |
| 2008/0310507 | A1* | 12/2008 | Ye et al. | 375/240.12 |
| 2008/0310512 | A1* | 12/2008 | Ye et al. | 375/240.16 |
| 2009/0097558 | A1* | 4/2009 | Ye et al. | 375/240.13 |
| 2009/0122861 | A1 | 5/2009 | Bjontegaard et al. | |
| 2010/0020875 | A1* | 1/2010 | Macq | 375/240.13 |
| 2010/0118957 | A1* | 5/2010 | Demos | 375/240.15 |
| 2011/0032983 | A1* | 2/2011 | Sezer | 375/240.02 |
| 2011/0249724 | A1* | 10/2011 | Nguyen et al. | 375/240.03 |
| 2012/0163469 | A1* | 6/2012 | Kim et al. | 375/240.18 |
| 2012/0281753 | A1* | 11/2012 | Misra et al. | 375/240.03 |

OTHER PUBLICATIONS

Felix C. A. Fernandes, "Low-Complexity Rotational Transform", Presentation for JCT-VC-C096, Oct. 7-15, 2010, pp. 1-9, Joint Collaborative Team on Video Coding (JCT-VC) of ITU-T SG16 WP3 and ISO/IEC JTC1/SC29/WG11, 3rd Meeting, Guangzhou, China.

Marta Karczewicz, et al., "Video Coding Technology Proposal by Qualcomm Inc.", JCTVC-A121, Apr. 15-23, 2010, pp. 1-24, Joint Collaborative Team on Video Coding (JCT-VC) of ITU-T SG16 WP3 and ISO/IEC JTC1/SC29/WG11, Dresden, Germany.

"Test Model under Consideration", JCTVC-A205, Apr. 15-23, 2010, pp. 1-30, Joint Collaborative Team on Video Coding (JCT-VC) of ITU-T SG16 WP3 and ISO/IEC JTC1/SC29/WG11, Dresden, Germany.

Chuohao Yeo, et al., "Mode-Dependent Fast Separable KLT for Block-based Intra Coding", JCTVC-B024, Jul. 21-28, 2010, pp. 1-7, Joint Collaborative Team on Video Coding (JCT-VC) of ITU-T SG16 WP3 and ISO/IEC JTC1/SC29/WG11, Geneva, Switzerland.

Chuohao Yeo, et al., "Mode-dependent Fast Separable KLT for Block-Based Intra Coding", Presentation for JCTVC-B024, Jul. 21-28, 2010, pp. 1-14, Joint Collaborative Team on Video Coding (JCT-VC) of ITU-T SG16 WP3 and ISO/IEC JTC1/SC29/WG11, Geneva, Switzerland.

Felix C. A. Fernandes, "Low Complexity Rotational Transform", JCTVC-C096, Oct. 7-15, 2010, pp. 1-7, Joint Collaborative Team on Video Coding (JCT-VC) of ITU-T SG16 WP3 and ISO/IEC JTC1/SC29/WG11, Guangzhou, China.

Maxine Lee and Alex Moore, "H.264 Encoder Design", Massachusetts Institute of Technology, 6.375 Complex Digital Systems Final Projects, Group 3 Final Report, May 17, 2006, pp. 1-20.

Ching-Yu Hung and Paul Landman, "Compact Inverse Discrete Cosine Transform Circuit for MPEG Video Decoding", 1997 IEEE Workshop on Signal Processing Systems, Nov. 3-5, 1997, pp. 1-10.

Jun Sung Park and Hyo Jung Song, "Selective Intra Prediction Mode Decision for H.264/AVC Encoders", World Academy of Science, Engineering and Technology, vol. 13, 2006, pp. 51-55.

Marta Karczewicz, "Improved Intra Coding", VCEG-AF15, Apr. 20-21, 2007, pp. 1-4, ITU—Telecommunications Standardization Sector, Study Group 16, Question 6, Video Coding Experts Group (VCEG), San Jose, CA.

Yan Ye and Marta Karczewicz, "Improved Intra Coding", VCEG-AG11, Oct. 20, 2007, pp. 1-6, ITU—Telecommunications Standardization Sector, Study Group 16, Question 6, Video Coding Experts Group (VCEG), Shenzhen, China.

TK Tan, et al., "Recommended Simulation Common Conditions for Coding Efficiency Experiments Revision 4", VCEG-AJ10, Jul. 8-10, 2008, pp. 1-8, ITU—Telecommunications Standardization Sector, Study Group 16, Question 6, Video Coding Experts Group (VCEG), San Diego, CA.

Madhukar Budagavi and Minhua Zhou, "Orthogonal MDDT and Mode Dependent DCT", VCEG-AM20_r1, Jan. 17-22, 2010, pp. 1-9, ITU—Telecommunications Standardization Sector Study Group 16, Question 6, Video Coding Experts Group (VCEG), Kyoto, Japan.

Madhukar Budagavi and Minhua Zhou, "Orthogonal MDDT and Mode Dependent DCT (VCEG-AM20)", Presentation for VCEG-AM20, Jan. 17-22, 2010, pp. 1-11, ITU—Telecommunications Standardization Sector, Study Group 16, Question 6, Video Coding Experts Group (VCEG), Kyoto, Japan.

Gisle Bjontegaard, "Calculation of Average PSNR Differences Between RD-curves", VCEG-M33, Apr. 2-4, 2001, pp. 1-4, ITU—Telecommunications Standardization Sector Study Group 16, Question 6, Video Coding Experts Group (VCEG), Austin, TX.

TK Tan, et al., "Recommended Simulation Common Conditions for Coding Efficiency Experiments Revision 4", VCEG-AJ10r1, Jul. 8-10, 2008, pp. 1-8, ITU—Telecommunications Standardization Sector, Study Group 16, Question 6, Video Coding Experts Group (VCEG), San Diego, CA.

Madhukar Budagavi, et al., "Description of Video Coding Technology Proposal by Texas Instruments Inc.", JCTVC-A101, Apr. 15-23, 2010, pp. 1-45, Joint Collaborative Team on Video Coding (JCT-VC) of ITU-T SG16 WP3 and ISO/IEC JTC1/SC29/WG11, Dresden, Germany.

Madhukar Budagavi, et al., "Video Coding Technology Proposal by Texas Instruments Inc. (JCTVC-A101.doc)", Presentation for JCTVC-A101, Apr. 15-23, 2010, pp. 1-22, Joint Collaborative Team on Video Coding (JCT-VC) of ITU-T SG16 WP3 and ISO/IEC JTC1/SC29/WG11, Dresden, Germany.

* cited by examiner

| SEQUENCE NAME | PRIOR ART MDDT | | SINGLE TRANSFORM MATRIX | | TRANSFORM MATRIX APPROXIMATION | |
|---|---|---|---|---|---|---|
| | BD_PSNR | BD_Rate | BD_PSNR | BD_Rate | BD_PSNR | BD_Rate |
| BQSquare_p416x240_60fps_420pl_601fr | 0.39 | -4.18 | 0.38 | -4.14 | 0.23 | -2.50 |
| BasketballPass_p416x240_50fps_420pl_501fr | 0.30 | -5.01 | 0.33 | -5.59 | 0.21 | -3.62 |
| BlowingBubbles_p416x240_50fps_420pl_501fr | 0.26 | -4.20 | 0.26 | -4.09 | 0.18 | -2.91 |
| RaceHorsesD_p416x240_30fps_420pl_300fr | 0.37 | -5.03 | 0.35 | -4.83 | 0.26 | -3.60 |
| BQMall_p832x480_60fps_420pl_601fr | 0.38 | -5.73 | 0.38 | -5.76 | 0.28 | -4.34 |
| BasketballDrill_p832x480_50fps_420pl_501fr | 0.28 | -5.50 | 0.27 | -5.32 | 0.20 | -4.07 |
| PartyScene_p832x480_50fps_420pl_501fr | 0.31 | -3.71 | 0.31 | -3.71 | 0.21 | -2.50 |
| RaceHorsesC_p832x480_30fps_420pl_300fr | 0.26 | -3.76 | 0.26 | -3.71 | 0.21 | -3.02 |
| vidyo1_p1280x720_60fps_420pl_600fr | 0.50 | -9.16 | 0.50 | -9.15 | 0.44 | -8.10 |
| vidyo3_p1280x720_60fps_420pl_600fr | 0.58 | -9.55 | 0.57 | -9.44 | 0.50 | -8.34 |
| vidyo4_p1280x720_60fps_420pl_600fr | 0.39 | -8.32 | 0.40 | -8.36 | 0.36 | -7.61 |
| BQTerrace_p1920x1080_60fps_420pl_601fr | 0.33 | -5.04 | 0.33 | -4.92 | 0.26 | -3.91 |
| BasketballDrive_p1920x1080_50fps_420pl_501fr | 0.17 | -6.09 | 0.16 | -5.94 | 0.15 | -5.60 |
| Cactus_p1920x1080_50fps_420pl_500fr | 0.24 | -5.89 | 0.23 | -5.67 | 0.21 | -4.98 |
| Kimono1_p1920x1080_24fps_420pl_240fr | 0.27 | -7.49 | 0.27 | -7.43 | 0.27 | -7.46 |
| ParkScene_p1920x1080_24fps_420pl_240fr | 0.27 | -5.91 | 0.27 | -5.93 | 0.26 | -5.68 |
| | | | | | | |
| Average | 0.33 | -5.91 | 0.33 | -5.87 | 0.26 | -4.89 |
| Max | 0.58 | -3.71 | 0.57 | -3.71 | 0.50 | -2.50 |
| Min | 0.17 | -9.55 | 0.16 | -9.44 | 0.15 | -8.34 |

FIG. 6

| SEQUENCE NAME | PRIOR ART MDDT | | SINGLE TRANSFORM MATRIX | | TRANSFORM MATRIX APPROXIMATION | |
|---|---|---|---|---|---|---|
| | BD_PSNR | BD_Rate | BD_PSNR | BD_Rate | BD_PSNR | BD_Rate |
| BQSquare_p416x240_60fps_420pl_601fr | 0.37 | -4.01 | 0.36 | -3.92 | 0.21 | -2.22 |
| BasketballPass_p416x240_50fps_420pl_501fr | 0.47 | -7.71 | 0.49 | -8.15 | 0.32 | -5.40 |
| BlowingBubbles_p416x240_50fps_420pl_501fr | 0.32 | -4.98 | 0.31 | -4.84 | 0.19 | -2.93 |
| RaceHorsesD_p416x240_30fps_420pl_300fr | 0.36 | -4.83 | 0.33 | -4.49 | 0.15 | -2.05 |
| BQMall_p832x480_60fps_420pl_601fr | 0.46 | -6.75 | 0.46 | -6.65 | 0.33 | -4.85 |
| BasketballDrill_p832x480_50fps_420pl_501fr | 0.30 | -5.67 | 0.29 | -5.42 | 0.17 | -3.14 |
| PartyScene_p832x480_50fps_420pl_501fr | 0.33 | -3.88 | 0.33 | -3.86 | 0.21 | -2.53 |
| RaceHorsesC_p832x480_30fps_420pl_300fr | 0.31 | -4.28 | 0.31 | -4.26 | 0.14 | -1.97 |
| vidyo1_p1280x720_60fps_420pl_600fr | 0.69 | -11.96 | 0.68 | -11.88 | 0.52 | -9.30 |
| vidyo3_p1280x720_60fps_420pl_600fr | 0.82 | -12.81 | 0.79 | -12.39 | 0.66 | -10.49 |
| vidyo4_p1280x720_60fps_420pl_600fr | 0.62 | -12.35 | 0.61 | -12.30 | 0.52 | -10.60 |
| BQTerrace_p1920x1080_60fps_420pl_601fr | 0.56 | -8.26 | 0.54 | -7.95 | 0.41 | -6.03 |
| BasketballDrive_p1920x1080_50fps_420pl_501fr | 0.38 | -12.94 | 0.38 | -13.05 | 0.36 | -12.14 |
| Cactus_p1920x1080_50fps_420pl_500fr | 0.32 | -7.30 | 0.30 | -7.01 | 0.21 | -4.91 |
| Kimono1_p1920x1080_24fps_420pl_240fr | 1.05 | -25.10 | 1.05 | -25.10 | 1.04 | -24.91 |
| ParkScene_p1920x1080_24fps_420pl_240fr | 0.29 | -6.03 | 0.27 | -5.67 | 0.17 | -3.57 |
| | | | | | | |
| Average | 0.48 | -8.68 | 0.47 | -8.56 | 0.35 | -6.69 |
| Max | 1.05 | -3.88 | 1.05 | -3.86 | 1.04 | -1.97 |
| Min | 0.29 | -25.10 | 0.27 | -25.10 | 0.14 | -24.91 |

*FIG. 7*

METHOD AND SYSTEM FOR INTRACODING IN VIDEO ENCODING

CROSS-REFERENCE TO RELATED APPLICATIONS

This application claims benefit of U.S. Provisional Patent Application Ser. No. 61/295,075, filed Jan. 14, 2010, and of U.S. Provisional Patent Application Ser. No. 61/295,911, filed Jan. 18, 2010, both of which are incorporated herein by reference in their entirety.

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, video gaming devices, digital cameras, cellular telephones, video jukeboxes, high-end displays and personal video recorders). Further, video applications are becoming increasingly mobile as a result of higher computation power in handsets, advances in battery technology, and high-speed wireless connectivity.

Video compression, i.e., video coding, is an essential enabler for digital video products as it enables the storage and transmission of digital video. In general, video compression techniques apply prediction, transformation, quantization, and entropy coding to sequential blocks of pixels, i.e., coding blocks, in a video sequence to compress, i.e., encode, the video sequence. A coding block is a subset of a frame or a portion of a frame, e.g., a slice or a block of 64×64 pixels, in a video sequence and a coding block and a frame may be inter-coded or intra-coded. For encoding, a coding block may be divided into prediction blocks, e.g., 4×4, or 8×8 or 16×16 blocks of pixels. Prediction blocks may be inter-coded or intra-coded as well. In an intra-coded coding block, all prediction blocks are intra-coded. In an inter-coded coding block, the prediction blocks may be either intra-coded or inter-coded.

For intra-coded prediction blocks, spatial prediction is performed using different spatial prediction modes that specify the direction, e.g., horizontal, vertical, diagonal, etc., in which pixels are predicted. For example, the H.264/AVC video coding standard provides nine 4×4 spatial prediction modes, nine 8×8 spatial prediction modes, and four 16×16 spatial prediction modes for spatial prediction in the luminance space, and four 8×8 prediction modes in the chrominance space. Future standards may provide more spatial prediction modes and/or larger sizes of prediction blocks. In general, spatial prediction predicts a current prediction block, i.e., an actual prediction block in a coding block of a frame, based on surrounding pixels in the same frame using each of the spatial prediction modes, and selects for output the predicted prediction block and prediction mode that yields a predicted prediction block most closely resembling the pixels in the current prediction block. The predicted prediction block is then subtracted from the current prediction block to compute a residual prediction block, and transform coding is applied to the residual prediction block to reduce redundancy.

Prediction mode dependent directional transforms may be used in transform coding of spatially predicted i.e., intra-coded, prediction blocks. In one technique for using prediction mode dependent transforms, referred to as Mode-Dependent Directional Transform (MDDT), a set of predetermined, trained transform matrices $(B_i, A_i)$, $i=0, \ldots, n-1$, is provided, one for each of n spatial prediction modes. The transform coding selects which of the transform matrices to use based on the spatial prediction mode selected by the spatial prediction. More specifically, if a residual prediction block X results from using prediction mode i, the transformed version of X, i.e., the 2D transform coefficients of X, is given by: $Y=B_i X A_i^T$ where $B_i$ and $A_i$ are column and row transforms. In H.264, $B_i=A_i=M$, where M is a Discrete Cosine Transform (DCT) transform matrix. Further, a form of a Karhunen-Loève Transform (KLT) is used to determine $B_i$ and $A_i$. More specifically, singular value decomposition (SVD) is performed on cross-correlated residual blocks of each prediction mode i collected from training video sequences to determine $B_i$ and $A_i$.

To use MDDT, two transform matrices must be stored for each spatial prediction mode. For example, if there are twenty-two spatial prediction modes as in H.264/AVC, forty-four transform matrices are required. Further, using transform matrices as generated for MDDT is computationally complex, especially as compared to the more commonly used DCT, since it may require a full matrix multiply. That is, transform coding of an N×N block may require 2×N×N×N multiplications and 2×N×N×(N−1) additions. Thus, using these transform matrices may not be well suited for encoding on resource limited devices. Additional information regarding MDDT may be found in the following documents published by the ITU-Telecommunications Standardization Sector of the Video Coding Experts Group (VCEG): VCEG-AG11, VCEG-AM20, and VCEG-AF15, and in JCTVC-B024 published by the Joint Collaborative Team on Video Coding (JVT-VC) of ITU-T SG16 WP3 and ISO/IEC JTC1/SC29/WG11.

BRIEF DESCRIPTION OF THE DRAWINGS

Particular embodiments in accordance with the invention will now be described, by way of example only, and with reference to the accompanying drawings:

FIGS. 6 and 7 show graphs in accordance with one or more embodiments of the invention.

DETAILED DESCRIPTION OF EMBODIMENTS OF THE INVENTION

Figure 1:
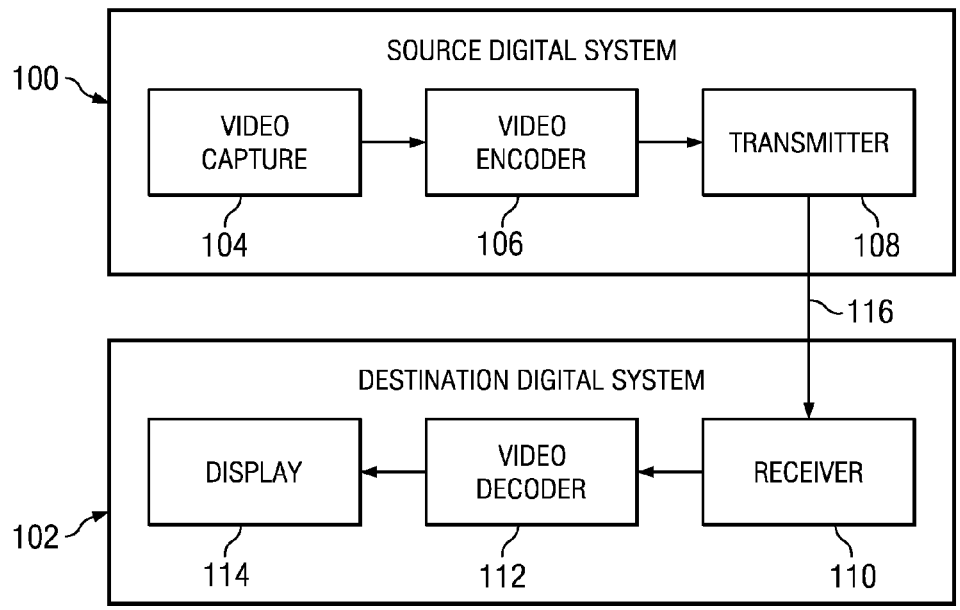
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, although reference may be made to the H.264/AVC video coding standard herein for purpose of illustration, embodiments of the invention should not be considered limited to any particular video coding standard.

In general, embodiments of the invention provide for prediction mode dependent directional transform coding based on a single directional transform matrix instead of the two transform matrices required in the prior art. The single directional transform matrix for a prediction mode is determined using a form of KLT is which eigenvalue decomposition (EVD), also referred to as eigen-decomposition or spectral decomposition, is performed on auto-correlated residual blocks of each prediction mode collected from training video sequences. In some embodiments of the invention, the predetermined trained single directional transform matrices for the prediction modes are used in encoding, requiring the storage of one matrix per prediction mode. Note that the prior art MDDT requires the storage of two matrices. Further, as is explained in more detail herein, the use of the single directional transform matrices reduces the size of a hardware implementation as compared to the prior art use of two transform matrices. Moreover, evaluations of the use of the single directional transform matrices in encoding as compared to the use of the two transform matrices have shown similar coding efficiency.

In some embodiments of the invention, rather than using the single directional transform matrices, each directional transform matrix is approximated as a product of a DCT matrix, e.g., a DCT matrix defined in an encoding standard for use in intra-coding, and a sparse matrix derived from the directional transform matrix. The same DCT matrix is used for all prediction modes of the same block size. For example, for 4×4 prediction modes, a 4×4 DCT matrix is used and for 8×8 prediction modes, an 8×8 DCT matrix is used. Thus, in some such embodiments, the storage requirements are the DCT matrices for each prediction block size and representations of the sparse matrices for the prediction modes. The representations of the sparse matrices may be the entire matrices or non-zero elements of the sparse matrices. For example, if the sparse matrices are diagonal matrices, the diagonal elements of the matrices may be stored rather than the entire matrices. As is explained in more detail herein, the use of the approximations may further reduce the size of a hardware implementation. Moreover, evaluations of the use of the approximations of the single directional transform matrices in encoding as compared to the use of the single directional transform matrices have shown small coding efficiency losses, which may be acceptable in view of the reduced computational complexity.

FIG. 1 shows a block diagram of a digital system in accordance with one or more embodiments of the invention. The system includes a source digital system (100) that transmits encoded video sequences to a destination digital system (102) via a communication channel (116). The source digital system (100) includes a video capture component (104), a video encoder component (106) and a transmitter component (108). The video capture component (104) is configured to provide a video sequence to be encoded by the video encoder component (106). The video capture component (104) may be for example, a video camera, a video archive, or a video feed from a video content provider. In some embodiments of the invention, the video capture component (104) may generate computer graphics as the video sequence, or a combination of live video and computer-generated video.

The video encoder component (106) receives a video sequence from the video capture component (104) and encodes it for transmission by the transmitter component (1108). In general, the video encoder component (106) receives the video sequence from the video capture component (104) as a sequence of frames, divides the frames into coding blocks which may be a whole frame or a part of a frame, divides the coding blocks into prediction blocks, and encodes the video data in the coding blocks based on the prediction blocks. During the encoding process, a method for prediction mode dependent directional transform coding in accordance with one or more of the embodiments described herein may be performed. The functionality of embodiments of the video encoder component (106) is described in more detail below in reference to FIG. 2.

The transmitter component (108) transmits the encoded video data to the destination digital system (102) via the communication channel (116). The communication channel (116) may be any communication medium, or combination of communication media suitable for transmission of the encoded video sequence, such as, for example, wired or wireless communication media, a local area network, or a wide area network.

The destination digital system (102) includes a receiver component (110), a video decoder component (112) and a display component (114). The receiver component (110) receives the encoded video data from the source digital system (100) via the communication channel (116) and provides the encoded video data to the video decoder component (112) for decoding. In general, the video decoder component (112) reverses the encoding process performed by the video encoder component (106) to reconstruct the coding blocks of the video sequence. During the decoding process, a method for prediction mode dependent directional transform decoding in accordance with one or more of the embodiments described herein may be performed. The functionality of embodiments of the video decoder component (112) is described in more detail below in reference to FIG. 3.

The reconstructed video sequence may then be displayed on the display component (114). The display component (114) may be any suitable display device such as, for example, a plasma display, a liquid crystal display (LCD), a light emitting diode (LED) display, etc.

In some embodiments of the invention, the source digital system (100) may also include a receiver component and a video decoder component and/or the destination digital system (102) may include a transmitter component and a video encoder component for transmission of video sequences both directions for video steaming, video broadcasting, and video telephony. Further, the video encoder component (106) and the video decoder component (112) may perform encoding and decoding in accordance with one or more video compression standards such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), ITU-T/ISO High Efficiency Video Coding (HEVC) standard, etc. The video encoder component (106) and the video decoder component (112) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2:
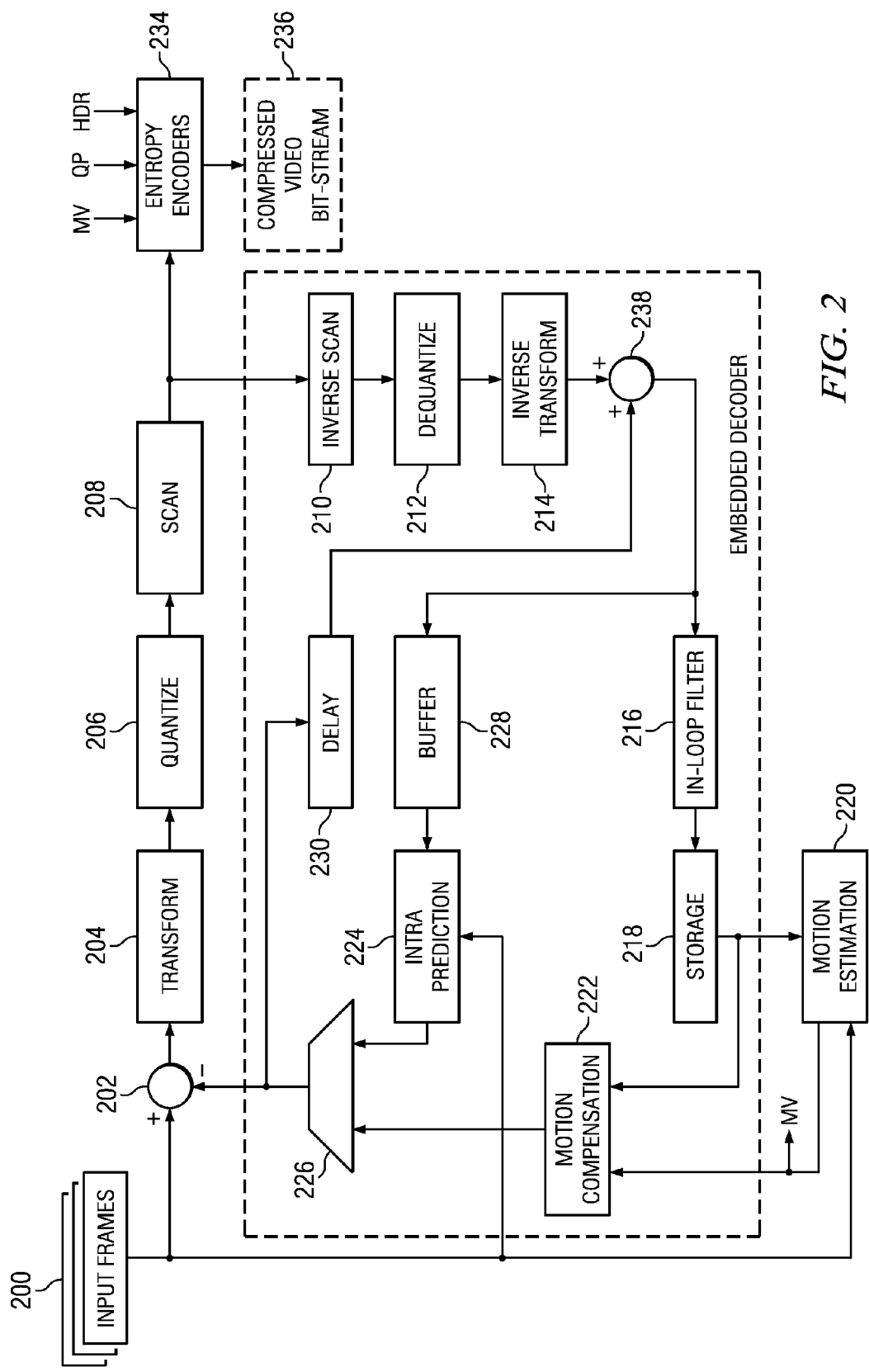
FIG. 2 shows a block diagram of a video encoder in accordance with one or more embodiments of the invention.

FIG. 2 shows a block diagram of a video encoder, e.g., the video encoder (114) of FIG. 1, in accordance with one or more embodiments of the invention. In the video encoder of FIG. 2, input frames (200) for encoding are divided into coding blocks and the coding blocks are provided as one input of a motion estimation component (220), as one input of an intra prediction component (224), and to a positive input of a combiner (202) (e.g., adder or subtractor or the like). Further, although not specifically shown, a prediction mode, i.e., inter-prediction or intra-prediction, for each input frame is selected and provided to a mode selector component and the entropy encoders (234).

The storage component (218) provides reference data to the motion estimation component (220) and to the motion compensation component (222). The reference data may include one or more previously encoded and decoded coding blocks, i.e., reconstructed coding blocks.

The motion estimation component (220) provides motion estimation information to the motion compensation component (222) and the entropy encoders (234). More specifically, the motion estimation component (220) performs tests on coding blocks based on multiple temporal prediction modes using reference data from storage (218) to choose the best motion vector(s)/prediction mode based on a coding cost. To test the prediction modes, the motion estimation component (220) may divide a coding block into prediction blocks according to the block size of a prediction mode. The motion estimation component (220) provides the selected motion vector (MV) or vectors and the selected prediction mode to the motion compensation component (222) and the selected motion vector (MV) to the entropy encoders (234). The motion compensation component (222) provides motion compensated inter prediction information to a selector switch (226) that includes motion compensated inter prediction blocks and the selected temporal prediction modes. The coding cost of the inter prediction blocks are also provided to the mode selector component.

The intra prediction component (224) provides intra prediction information to the selector switch (226) that includes intra prediction blocks and the corresponding spatial prediction modes. That is, the intra prediction component (224) performs spatial prediction in which tests based on multiple spatial prediction modes are performed on the coding block using previously encoded neighboring blocks of the frame from the buffer (228) to choose the best spatial prediction mode for generating an intra prediction block based on a coding cost. To test the spatial prediction modes, the intra prediction component (224) may divide a coding block into prediction blocks according to the block size of a prediction mode. Although not specifically shown, the spatial prediction mode of each intra prediction block provided to the selector switch (226) is also provided to the transform component (204). Further, the coding cost of the intra prediction blocks are also provided to the mode selector component.

The selector switch (226) selects between the motion-compensated inter prediction blocks from the motion compensation component (222) and the intra prediction blocks from the intra prediction component (224) based on the difference metrics of the blocks and a frame prediction mode provided by the mode selector component. The output of the selector switch (226), i.e., the predicted prediction block, is provided to a negative input of the combiner (202) and to a delay component (230). The output of the delay component (230) is provided to another combiner (i.e., an adder) (238). The combiner (202) subtracts the predicted prediction block from the current prediction block of the current coding block to provide a residual prediction block to the transform component (204). The resulting residual prediction block is a set of pixel difference values that quantify differences between pixel values of the original prediction block and the predicted prediction block.

The transform component (204) performs a block transform on the residual prediction blocks to convert the residual pixel values to transform coefficients and outputs the transform coefficients. Further, the transform component (204) applies block transforms to intra-coded residual prediction blocks based on the spatial prediction mode used. That is, the block transform used for an intra-coded residual prediction block is selected based on the spatial prediction mode provided by the intra prediction component (224). In some embodiments of the invention, the transform component (204) may select the block transform to be applied from among a number of different types of block transforms, such as, for example, DCTs, integer transforms, wavelet transforms, directional transforms, or combinations thereof based on the spatial prediction mode. In some embodiments of the invention, for one or more of the spatial prediction modes, the block transform selected may be based on predetermined single directional transform matrices trained for each of the spatial prediction modes. For example, if the spatial prediction mode is one with limited directionality, the block transform selected may be a DCT, and if the spatial prediction mode is one with significant directionality, the block transform selected may be a directional transform. The directional transforms for the spatial prediction modes with significant directionality may be based on predetermined single directional transform matrices trained for each of these spatial prediction modes. In some embodiments of the invention, directional transforms based on predetermined single directional transform matrices may be provided for all spatial prediction modes regardless of the amount of directionality.

Each of the predetermined directional transform matrices may be trained, i.e., empirically determined, using a set of training video sequences. For example, for a prediction mode i, prediction residuals for the mode i are determined from the training video sequences, are auto-correlated, and eigenvalue decomposition is performed on the result of the auto-correlation to generate the directional transform matrix. More specifically, the rows or columns of the prediction residuals for the prediction mode i are assembled in a matrix, an auto-correlation matrix of this matrix is computed, and eigenvalue decomposition is performed on the auto-correlation matrix to determine a row or column directional transform matrix.

Only one of the row or column directional transform matrices is required to be computed as the row and column directional transform matrices computed in this way are transposes of the other. The resulting direction transform matrix or its transform may be the single directional transform matrix upon which the block transform for the prediction mode i is based. Note that the single directional transform matrix has the same size as the block size of the prediction mode i. That is, if prediction mode i is for a 4×4 block, the single directional transform matrix is 4×4.

In some embodiments of the invention, if the trained directional transform matrices for two or more spatial prediction modes are sufficiently similar, rather than using a separate directional transform matrix for each of the spatial prediction modes, the training process may include generating one directional transform matrix to provide the basis for the block transform of all of the two or more spatial prediction modes. For example, tests may be executed using each of the two or more trained directional transform matrices for transforming blocks in each of the two or more prediction modes, and the trained directional transform matrix showing the best results may be selected as the one directional transform matrix for the two or more spatial modes. In another example, the one directional transform matrix may be derived from the two or more trained directional transform matrices. For example, the entries in the two or more trained directional transform entries may be averaged to produce corresponding entries in the one directional transform matrix.

In some embodiments of the invention, the transform component (204) stores predetermined single directional transform matrices for one or more of the spatial prediction modes, e.g., the significantly directional spatial prediction modes, and selects which of the directional transform matrices to use based on the spatial prediction mode of the block to be transformed. In some such embodiments, there is a one-to-one correspondence between a spatial prediction mode and a directional transform matrix. That is, if there are, for example, eight significantly directional spatial prediction modes, eight directional transform matrices are stored. In other such embodiments, two or more of the spatial prediction modes may share a single directional transform matrix. Each directional transform matrix has the same dimensions as the block size of the corresponding spatial prediction mode. For each of the one or more spatial prediction modes i, the transform component (204) computes the transformed version Y of a residual prediction block X as $Y=S_i X S_i^T$ where $S_i$ is the selected single directional transform matrix for prediction mode i. Note that, at most, half the number of matrices needs to be stored as compared to the prior art MDDT. Further, in a hardware implementation, half of the area of the prior art MDDT may be needed as the same matrix multiplication logic can be used for both matrix multiplies in the transform.

In some embodiments of the invention, the transform component (204) performs the block transforms using approximations of the predetermined single directional transform matrices. That is, each single directional transform matrix $S_i$ is approximated as $D_i C$ where C is a DCT matrix, and $D_i$ is a sparse matrix derived from $S_i$. The DCT matrix may be, for example, a DCT matrix specified by a coding standard for a particular residual prediction block size. Thus, the transform component (204) computes the transformed version Y of a residual prediction block X as $Y=D_i CXC^T D_i^T$. The sparse matrices $D_i$ may be any suitable sparse matrices, such as, for example, diagonal matrices or rotational matrices. For example, each sparse matrix $D_i$ derived from $S_i$ may be a diagonal matrix with diagonal elements having values of +1 or −1. One of ordinary skill in the art will understand the derivation of appropriate sparse matrices.

One possible derivation of a diagonal matrix $D_i$ from $S_i$ is now explained by way of example. Note that $S_i=D_i C$, thus $D_i=S_i*inv(C)$. Assume that $$S_3 = \begin{bmatrix} 0.4253 & -0.7310 & -0.4549 & 0.2791 \\ 0.5213 & -0.2756 & 0.5952 & -0.5459 \\ 0.5392 & 0.3716 & 0.3255 & 0.6821 \\ 0.5066 & 0.5016 & -0.5769 & -0.3985 \end{bmatrix}$$

and the DCT matrix is $$C = \begin{bmatrix} 0.5000 & 0.5000 & 0.5000 & 0.5000 \\ 0.6533 & 0.2706 & -0.2706 & -0.6533 \\ 0.5000 & -0.5000 & -0.5000 & 0.5000 \\ 0.2706 & -0.6533 & 0.6533 & -0.2706 \end{bmatrix}$$

$D_3 = S_3 * inv(C)$, so $$D_3 = \begin{bmatrix} 0.9962 & -0.0580 & -0.0642 & -0.0103 \\ -0.0666 & -0.9804 & -0.1627 & 0.0893 \\ -0.0555 & 0.1527 & -0.9763 & -0.1432 \\ 0.0084 & 0.1104 & -0.1278 & 0.9856 \end{bmatrix}$$

The diagonal values in $D_3$ are then rounded and all other values set to 0 to generate a diagonal matrix $$D_3 = \begin{bmatrix} 1 & 0 & 0 & 0 \\ 0 & -1 & 0 & 0 \\ 0 & 0 & -1 & 0 \\ 0 & 0 & 0 & 1 \end{bmatrix}.$$

In one or more embodiments of the invention, the transform component (204) stores DCT matrices C for the various block sizes and a representation of each of the sparse matrices $D_i$. This representation may be the entire $D_i$ matrix or may be the nonzero values of the $D_i$ matrix. For example, if $D_i$ is a diagonal matrix, the diagonal values may be stored as the representation. In a hardware implementation, this approximation may require less area, as matrix multiplication logic for the computation $CXC^T$ may be shared for all transformation directions of a prediction block size.

The transform coefficients from the transform component (204) are provided to a quantization component (206) which outputs quantized transform coefficients. Because the DCT transform redistributes the energy of the residual signal into the frequency domain, the quantized transform coefficients are taken out of their raster-scan ordering a scan component (208) and arranged by significance, such as, for example, beginning with the more significant coefficients followed by the less significant. The ordered quantized transform coefficients provided via the scan component (208) along with header information are coded by the entropy encoder (234), which provides a compressed bitstream (236) for transmission or storage. The entropy coding performed by the entropy encoder (234) may be any suitable entropy encoding techniques, such as, for example, context adaptive variable length coding (CAVLC), context adaptive binary arithmetic coding (CABAC), run length coding, etc.

Inside every encoder is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients provided via the scan component (208) are returned to their original post-transform arrangement by an inverse scan component (210), the output of which is provided to a dequantize component (212), which outputs estimated transformed information, i.e., an estimated or reconstructed version of the transform result from the transform component (204). The estimated transformed information is provided to the inverse transform component (214), which outputs estimated residual information which represents a reconstructed version of the residual prediction block. The reconstructed residual prediction block is provided to the combiner (238).

The combiner (238) adds the delayed selected prediction block to the reconstructed residual prediction block to generate an unfiltered reconstructed prediction block, which becomes part of reconstructed frame information. The reconstructed frame information is provided via a buffer (228) to the intra prediction component (224) and to a filter component (216). The filter component (216) is an in-loop filter which filters the reconstructed frame information and provides filtered reconstructed coding blocks, i.e., reference data, to storage component (218).

Figure 3:
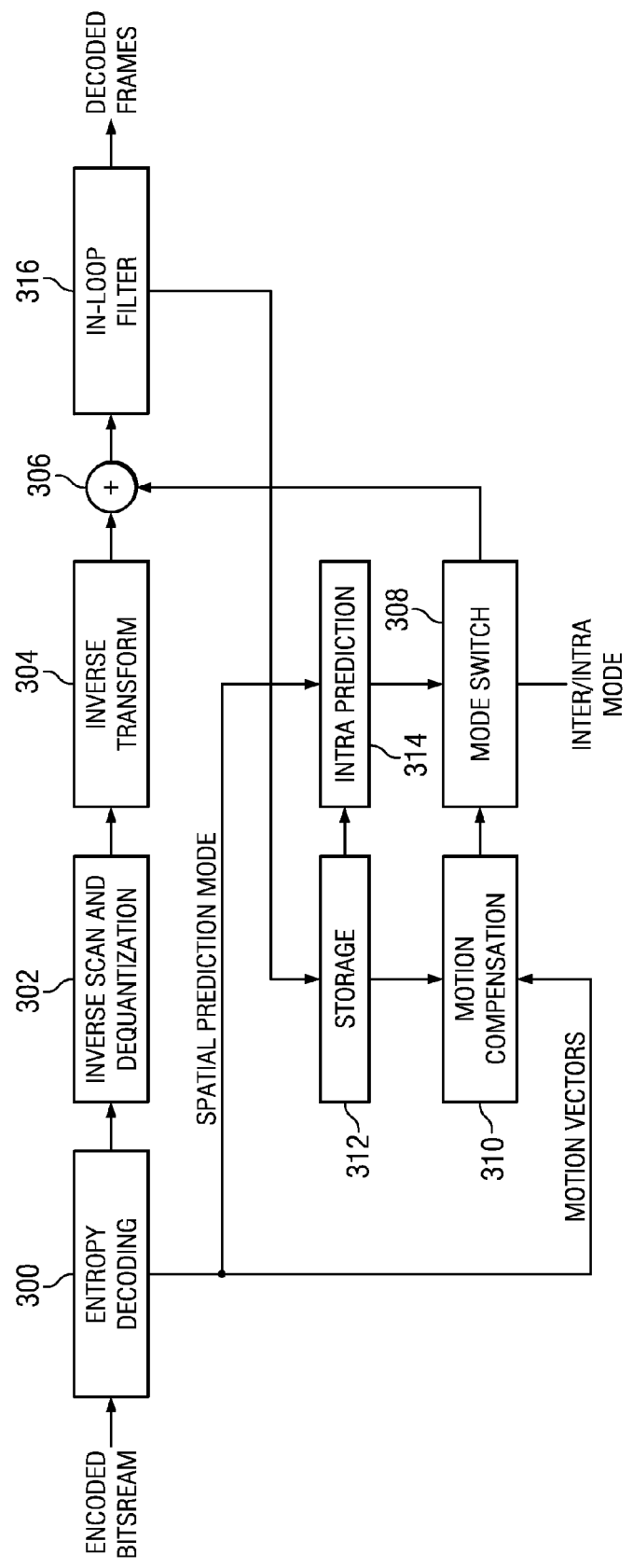
FIG. 3 shows a block diagram of a video decoder in accordance with one or more embodiments of the invention.

FIG. 3 shows a block diagram of a video decoder, e.g., the video decoder (112), in accordance with one or more embodiments of the invention. In the video decoder of FIG. 3, the entropy decoding component 300 receives an entropy encoded video bit stream and reverses the entropy encoding to recover the encoded coding blocks. The entropy decoding performed by the entropy decoder component (300) may include functionality to perform one or more of any suitable entropy decoding techniques, such as, for example, context adaptive variable length decoding (CAVLC), context adaptive binary arithmetic decoding (CABAC), run length decoding, etc.

The inverse scan and dequantization component (302) assembles the coding blocks in the video bit stream in raster scan order and substantially recovers the original frequency domain data, de-quantized residual coefficients. The inverse transform component (304) transforms the frequency domain data from inverse scan and dequantization component (302) back to a residual prediction block. That is, the inverse transform component (304) applies an inverse block transform, i.e., the inverse of the block transform used for encoding, to the de-quantized residual coefficients to produce the residual prediction block.

This residual prediction block supplies one input of the addition component (306). The other input of the addition component (306) comes from the mode switch (308). When inter-prediction mode is signaled in the encoded video stream, the mode switch (308) selects a prediction block from the motion compensation component (310) and when intra-prediction is signaled, the mode switch selects a prediction block from the intra prediction component (314). The motion compensation component (310) receives reference data from storage (312) and applies the motion compensation computed by the encoder and transmitted in the encoded video bit stream to the reference data to generate a prediction block. The intra-prediction component (314) receives previously decoded prediction blocks from the current frame and applies the intra-prediction computed by the encoder as signaled by a spatial prediction mode transmitted in the encoded video bit stream to the previously decoded prediction blocks to generate a prediction block.

The addition component (306) recovers the predicted prediction block, i.e., generates a decoded prediction block, by adding the selected prediction block and the residual prediction block. The output of the addition component (306) supplies the input of the in-loop filter component (316). The in-loop filter component (316) smoothes artifacts created by the block nature of the encoding process to improve the visual quality of the decoded frame. The output of the in-loop filter component (316) is the decoded frames of the video bit stream. Each decoded prediction block is stored in storage (312) to be used as reference data.

Figure 4:
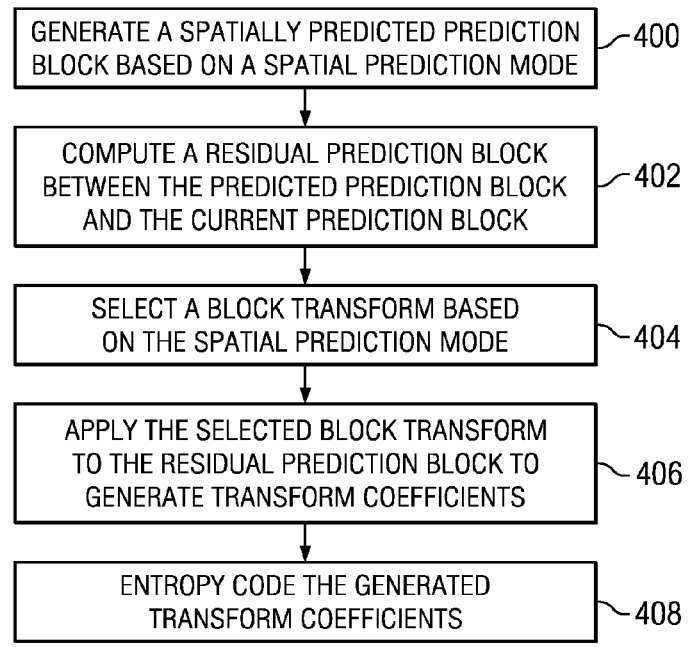
FIGS. 4 and 5 show flow diagrams of methods in accordance with one or more embodiments of the invention.

FIG. 4 is a flow diagram of a method for prediction mode dependent directional transform coding in accordance with one or more embodiments of the invention. Initially, a spatially predicted prediction block is generated based on a spatial prediction mode (404). A residual prediction block is then computed between the predicted prediction block and the current prediction block (402). A block transform for generating transform coefficients of the residual prediction block is selected based on the spatial prediction mode (404). The block transform may be selected from a number of different types of block transforms. The selected block transform may be based on a predetermined single directional transform matrix trained for the spatial prediction mode. In some embodiments of the invention, the selected block transform may be selectable for more than one spatial prediction mode. That is, the block transform may be used for more than one spatial prediction mode.

The selected block transform is then applied to the residual prediction block to generate transform coefficients (406). In one or more embodiments of the invention, the block transform is the single directional transform matrix, and application of the block transform is performed by computing $Y=SXS^T$ where Y is the transform coefficients, X is the residual prediction block, and S is the single directional transform matrix. In some embodiments of the invention, an approximation of the single directional transform matrix is used in the application of the block transform. That is, the single directional transform matrix S is approximated as DC where C is a DCT matrix and D is a sparse matrix empirically derived from the single directional transform matrix. In such embodiments, application of the block transform is performed by computing $Y=DCXC^TD^T$.

The generated transform coefficients are then entropy coded (408). The entropy coded transform coefficients are then emitted as part of a compressed video bit stream.

Figure 5:
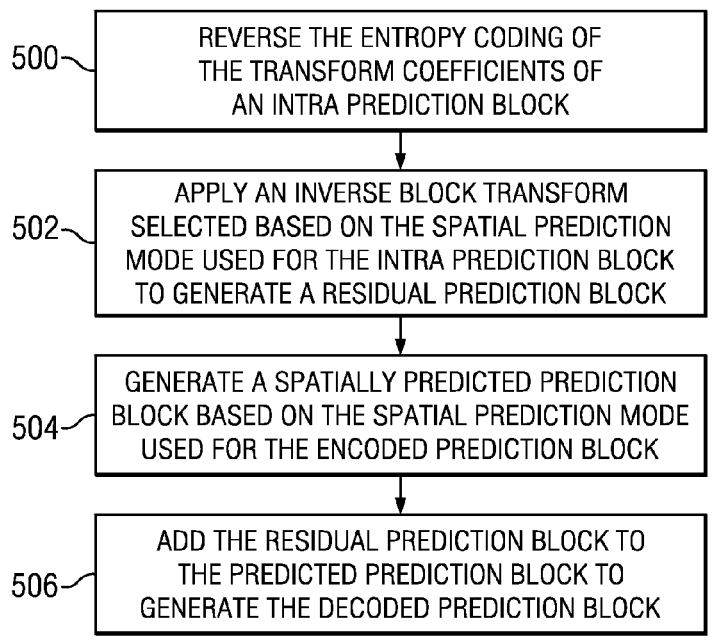

FIG. 5 is a flow diagram of a method for prediction mode dependent directional transform decoding in accordance with one or more embodiments of the invention. Initially, the entropy coding of the transform coefficients of an intra prediction block, i.e., a prediction block that was spatially predicted, is reversed (500). Then, an inverse block transform selected based on the spatial prediction mode used for the intra prediction block is applied to the transform coefficients to generate a residual prediction block (502). A spatially predicted prediction block is also generated based on the spatial prediction mode used for the intra prediction block (504). The residual prediction block is then added to the predicted prediction block to generate the decoded prediction block (506). The decoded prediction block is then emitted as part of a decoded video stream.

Simulations were performed to compare encoding performance using the prior art MDDT, using single directional transform matrices, and using approximations of the single directional transform matrices. For the simulations, a method using the 4×4 single directional transform matrices for nine 4×4 spatial prediction modes and a method using the approximations of the 4×4 single directional transform matrices were implemented in the jm11.0kta2.6r1 software. The jm11.0kta2.6r1 software is a version of the reference encoder for the H.26x coding standard currently under development that includes an implementation of the prior art MDDT. The implementation of the prior art MDDT stores two transform matrices, a column transform matrix $B_i$ and a row transform $A_i$, i=0.8 for each of the nine 4×4 spatial prediction modes and computes the transform version of a block X as $Y=B_i X A_i^T$. Table 1 shows the column transform matrices for each of the nine 4×4 prediction modes of the prior art MDDT and Table 2 shows the row transform matrices for each of the nine 4×4 spatial prediction modes of the prior art MDDT.

To simulate the method using the 4×4 single directional matrices in the jm11.0kta2.6r1 software, a 4×4 single directional transform matrix for each of the nine 4×4 spatial prediction modes was developed using a set of training video sequences substantially as previously described, and the transposes of these matrices were computed. These matrices were then substituted for the two transform matrices in the MDDT implementation. Tables 3 and 4 show these matrices. Note that they are transposes of each other.

To simulate the method using the approximations, diagonal matrices $D_i$ were derived from the 4×4 single directional transform matrices, and a $D_iC$ matrix and a $D_i^T C^T$ matrix were computed for each mode. The diagonal matrices were derived substantially as previously described. The $D_iC$ and $D_i^T C^T$ matrices were then substituted for the two transform matrices in the MDDT implementation. Tables 5 and 6 show the $D_iC$ and $D_i^T C^T$ matrices computed for each of the 9 modes. In addition to incorporating the matrices, the adaptive scanning was disabled for 4×4 blocks and the fixed scanning of H.264 was used. Further, the CfP video sequences were used in the simulations with simulation common conditions as recommended in ITU-T Q.6/SG16, VCEG-AJ10, and all frames were encoded in intra mode.

FIG. 6 shows simulation results for encoding the CfP video sequences allowing both 4×4 and 8×8 transforms for intra coding, and FIG. 7 shows simulations results for encoding the CfP video sequences allowing only 4×4 transforms for intra coding. The simulation results show the Bjontegaard Delta (BD) Peak Signal to Noise Ratio (BD-PSNR) and BD-Rate for each of the three methods as compared to encoding the CfP video sequences using the jm11.0kta2.6r1 software with MDDT disabled. BD-PSNR and BD-Rate are described in Gisle Bjontegaard, "Calculation of Average PSNR Differences between RD-curves", ITU-T SC16/Q6, 13th VCEG Meeting, Austin, Tex., USA, April 2001, Doc. VCEG-M33. Note that there was no appreciable difference in coding efficiency when the single directional transform matrices were used compared to the prior art MDDT. Further, when the transform matrix approximations were used, there was a loss in coding efficiency of about 1% as compared to the prior art MDDT when both transform sizes were allowed (FIG. 6) and of about 2% when only 4×4 transforms were allowed (FIG. 7).

TABLE 1

```
const int KLTCol[9][4][4]=
{
{ // 0
{ -42, -61, -73, -74 },
{  74,  65, -16, -81 },
{ -80,  37,  73, -57 },
{ -53,  84, -74,  33 },
},
{ // 1
```

TABLE 1-continued

```
{ -35, -62, -79, -71 },
{  82,  65, -24, -70 },
{ -78,  46,  59, -68 },
{ -49,  78, -78,  42 },
},
{ // 2
{ -47, -63, -72, -71 },
{  80,  57, -25, -78 },
{ -75,  50,  67, -62 },
{ -46,  82, -78,  37 },
},
{ // 3
{ -30, -60, -79, -75 },
{  72,  73, -10, -76 },
{ -84,  29,  69, -61 },
{ -56,  82, -73,  34 },
},
{ // 4
{ -30, -61, -80, -74 },
{  71,  73, -11, -77 },
{ -85,  28,  68, -62 },
{ -57,  81, -73,  35 },
},
{ // 5
{ -29, -57, -79, -78 },
{  72,  74,  -7, -75 },
{ -83,  26,  71, -61 },
{ -58,  83, -71,  32 },
},
{ // 6
{ -32, -61, -79, -74 },
{  70,  73, -14, -77 },
{ -85,  31,  67, -61 },
{ -56,  79, -74,  38 },
},
{ // 7
{ -34, -61, -77, -75 },
{  71,  71, -10, -79 },
{  83, -28, -72,  59 },
{  57, -83,  72, -32 },
},
{ // 8
{ -45, -61, -71, -74 },
{  91,  51, -31, -68 },
{ -68,  67,  54, -66 },
{ -38,  74, -86,  45 },
},
};
```

TABLE 2

```
const int KLTRow[9][4][4]=
{
{ // 0
{ -41,  86, -74, -42 },
{ -62,  56,  56,  79 },
{ -75, -26,  58, -82 },
{ -72, -71, -66,  41 },
},
{ // 1
{ -37,  75,  79,  56 },
{ -61,  67, -33, -84 },
{ -74, -13, -74,  73 },
{ -76, -78,  60, -30 },
},
{ // 2
{ -44,  84, -73, -45 },
{ -63,  56,  51,  82 },
{ -73, -25,  65, -79 },
{ -72, -75, -65,  36 },
},
{ // 3
{ -47,  87, -71, -39 },
{ -65,  50,  64,  75 },
{ -73, -34,  52, -85 },
{ -68, -71, -68,  46 },
},
```

TABLE 2-continued

```
{ // 4
    { -31,  72, -81, -60},
    { -60,  73,  29,  81},
    { -78, -13,  70, -72},
    { -75, -75, -63,  34},
},
{ // 5
    { -34,  76, -82, -53},
    { -61,  70,  39,  79},
    { -78, -18,  65, -76},
    { -74, -74, -63,  39},
},
{ // 6
    { -31,  73,  83,  57},
    { -60,  71, -28, -83},
    { -77,  -9, -71,  73},
    { -76, -77,  60, -31},
},
{ // 7
    { -46,  86, -72, -40},
    { -65,  52,  62,  75},
    { -73, -34,  53, -84},
    { -68, -72, -68,  46},
},
{ // 8
    { -34,  75,  81,  55},
    { -60,  69, -33, -83},
    { -76, -12, -72,  73},
    { -76, -77,  61, -32},
},
};
```

TABLE 3

```
const int KLTCol[9][4][4]=
{
{ // 0
    {  38,  58,  75,  78},
    { -80, -71,  25,  66},
    {  78, -53, -61,  61},
    {  50, -72,  80, -47},
},
{ // 1
    {  34,  54,  73,  84},
    {  64,  76,   7, -80},
    { -80,   8,  87, -49},
    {  69, -88,  59, -22},
},
{ // 2
    {  32,  59,  76,  78},
    { -71, -77,  15,  72},
    {  84, -35, -68,  59},
    {  58, -76,  75, -40},
},
{ // 3
    {  54,  67,  69,  65},
    { -94, -35,  48,  64},
    { -58,  76,  42, -74},
    {  36, -70,  87, -51},
},
{ // 4
    {  30,  58,  79,  77},
    { -65, -80,  10,  75},
    {  85, -23, -72,  59},
    {  64, -78,  70, -37},
},
{ // 5
    {  30,  54,  77,  82},
    { -58, -84,   0,  77},
    { -88,  16,  77, -50},
    {  65, -78,  68, -37},
},
{ // 6
    {  31,  57,  77,  79},
    {  60,  81,  -5, -78},
    { -82,  12,  80, -55},
    {  71, -80,  63, -32},
},
```

TABLE 3-continued

```
},
{ // 7
    {  45,  66,  73,  68},
    {  94,  46, -44, -60},
    {  64, -74, -40,  72},
    {  39, -66,  87, -54},
},
{ // 8
    {  29,  57,  78,  79},
    {  65,  80,  -6, -76},
    { -83,  18,  76, -58},
    {  66, -80,  67, -32},
},
};
```

TABLE 4

```
const int KLTRow[9][4][4]=
{
{ // 0
    {  38, -80,  78,  50},
    {  58, -71, -53, -72},
    {  75,  25, -61,  80},
    {  78,  66,  61, -47},
},
{ // 1
    {  34,  64, -80,  69},
    {  54,  76,   8, -88},
    {  73,   7,  87,  59},
    {  84, -80, -49, -22},
},
{ // 2
    {  32, -71,  84,  58},
    {  59, -77, -35, -76},
    {  76,  15, -68,  75},
    {  78,  72,  59, -40},
},
{ // 3
    {  54, -94, -58,  36},
    {  67, -35,  76, -70},
    {  69,  48,  42,  87},
    {  65,  64, -74, -51},
},
{ // 4
    {  30, -65,  85,  64},
    {  58, -80, -23, -78},
    {  79,  10, -72,  70},
    {  77,  75,  59, -37},
},
{ // 5
    {  30, -58, -88,  65},
    {  54, -84,  16, -78},
    {  77,   0,  77,  68},
    {  82,  77, -50, -37},
},
{ // 6
    {  31,  60, -82,  71},
    {  57,  81,  12, -80},
    {  77,  -5,  80,  63},
    {  79, -78, -55, -32},
},
{ // 7
    {  45,  94,  64,  39},
    {  66,  46, -74, -66},
    {  73, -44, -40,  87},
    {  68, -60,  72, -54},
},
{ // 8
    {  29,  65, -83,  66},
    {  57,  80,  18, -80},
    {  78,  -6,  76,  67},
    {  79, -76, -58, -32},
},
};
```

TABLE 5

```
const int KLTCol[9][4][4]=
{
{ // 0
{  64,  64,  64,  64},
{ -84, -35,  35,  84},
{  64, -64, -64,  64},
{  35, -84,  84, -35},
},
{ // 1
{  64,  64,  64,  64},
{  84,  35, -35, -84},
{ -64,  64,  64, -64},
{  35, -84,  84, -35},
},
{ // 2
{  64,  64,  64,  64},
{ -84, -35,  35,  84},
{  64, -64, -64,  64},
{  35, -84,  84, -35},
},
{ // 3
{  64,  64,  64,  64},
{ -84, -35,  35,  84},
{ -64,  64,  64, -64},
{  35, -84,  84, -35},
},
{ // 4
{  64,  64,  64,  64},
{ -84, -35,  35,  84},
{  64, -64, -64,  64},
{  35, -84,  84, -35},
},
{ // 5
{  64,  64,  64,  64},
{ -84, -35,  35,  84},
{ -64,  64,  64, -64},
{  35, -84,  84, -35},
},
{ // 6
{  64,  64,  64,  64},
{  84,  35, -35, -84},
{ -64,  64,  64, -64},
{  35, -84,  84, -35},
},
{ // 7
{  64,  64,  64,  64},
{  84,  35, -35, -84},
{  64, -64, -64,  64},
{  35, -84,  84, -35},
},
{ // 8
{  64,  64,  64,  64},
{  84,  35, -35, -84},
{ -64,  64,  64, -64},
{  35, -84,  84, -35},
},
};
```

TABLE 6

```
const int KLTRow[9][4][4]=
{
{ // 0
{  64, -84,  64,  35},
{  64, -35, -64, -84},
{  64,  35, -64,  84},
{  64,  84,  64, -35},
},
{ // 1
{  64,  84, -64,  35},
{  64,  35,  64, -84},
{  64, -35,  64,  84},
{  64, -84, -64, -35},
},
{ // 2
{  64, -84,  64,  35},
{  64, -35, -64, -84},
```

TABLE 6-continued

```
{  64,  35, -64,  84},
{  64,  84,  64, -35},
},
{ // 3
{  64, -84, -64,  35},
{  64, -35,  64, -84},
{  64,  35,  64,  84},
{  64,  84, -64, -35},
},
{ // 4
{  64, -84,  64,  35},
{  64, -35, -64, -84},
{  64,  35, -64,  84},
{  64,  84,  64, -35},
},
{ // 5
{  64, -84, -64,  35},
{  64, -35,  64, -84},
{  64,  35,  64,  84},
{  64,  84, -64, -35},
},
{ // 6
{  64,  84, -64,  35},
{  64,  35,  64, -84},
{  64, -35,  64,  84},
{  64, -84, -64, -35},
},
{ // 7
{  64,  84,  64,  35},
{  64,  35, -64, -84},
{  64, -35, -64,  84},
{  64, -84,  64, -35},
},
{ // 8
{  64,  84, -64,  35},
{  64,  35,  64, -84},
{  64, -35,  64,  84},
{  64, -84, -64, -35},
},
};
```

Embodiments of the encoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device, and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 10:
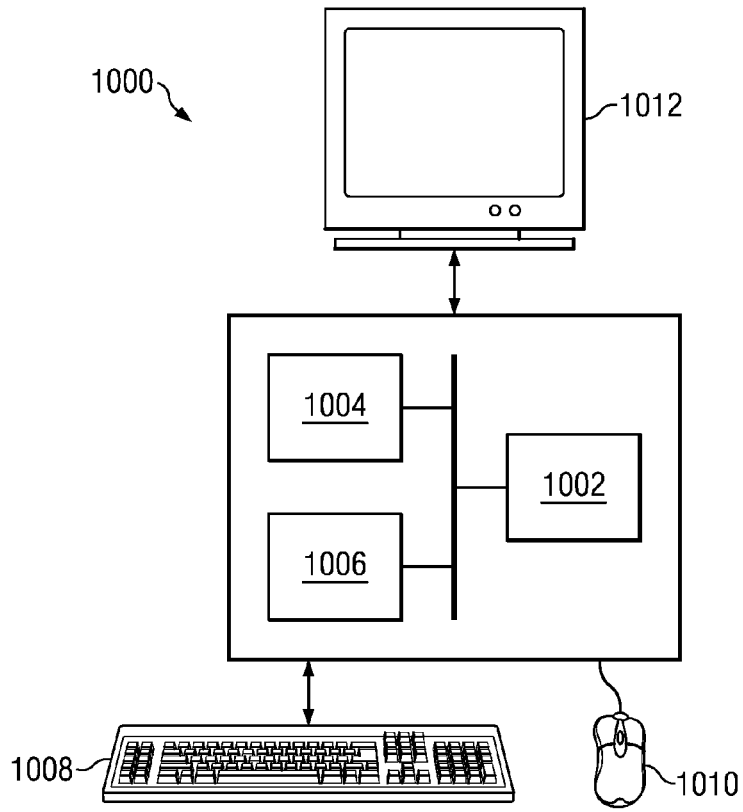
FIGS. 8-10 show illustrative digital systems in accordance with one or more embodiments of the invention.
Figure 8:
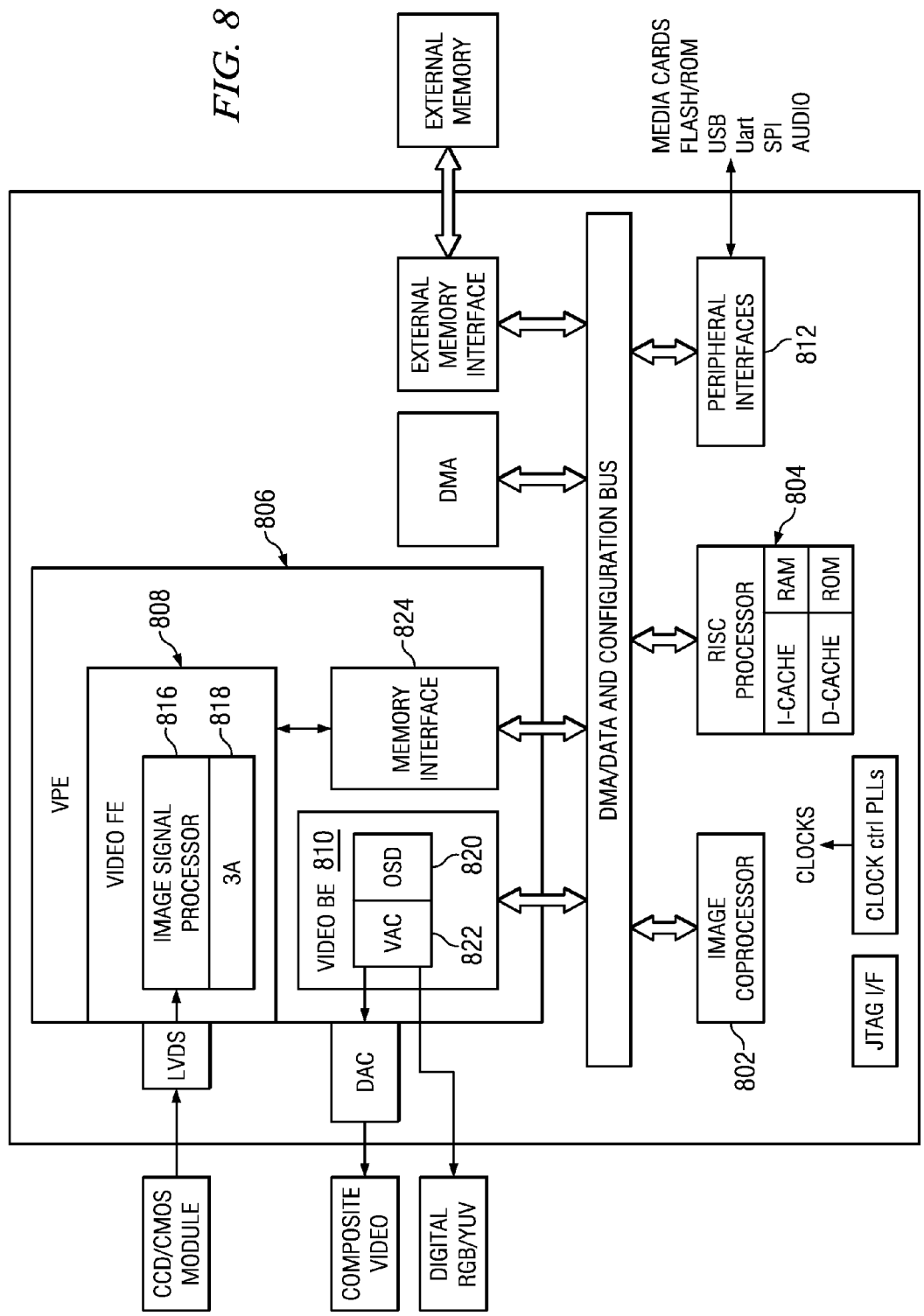
Figure 9:
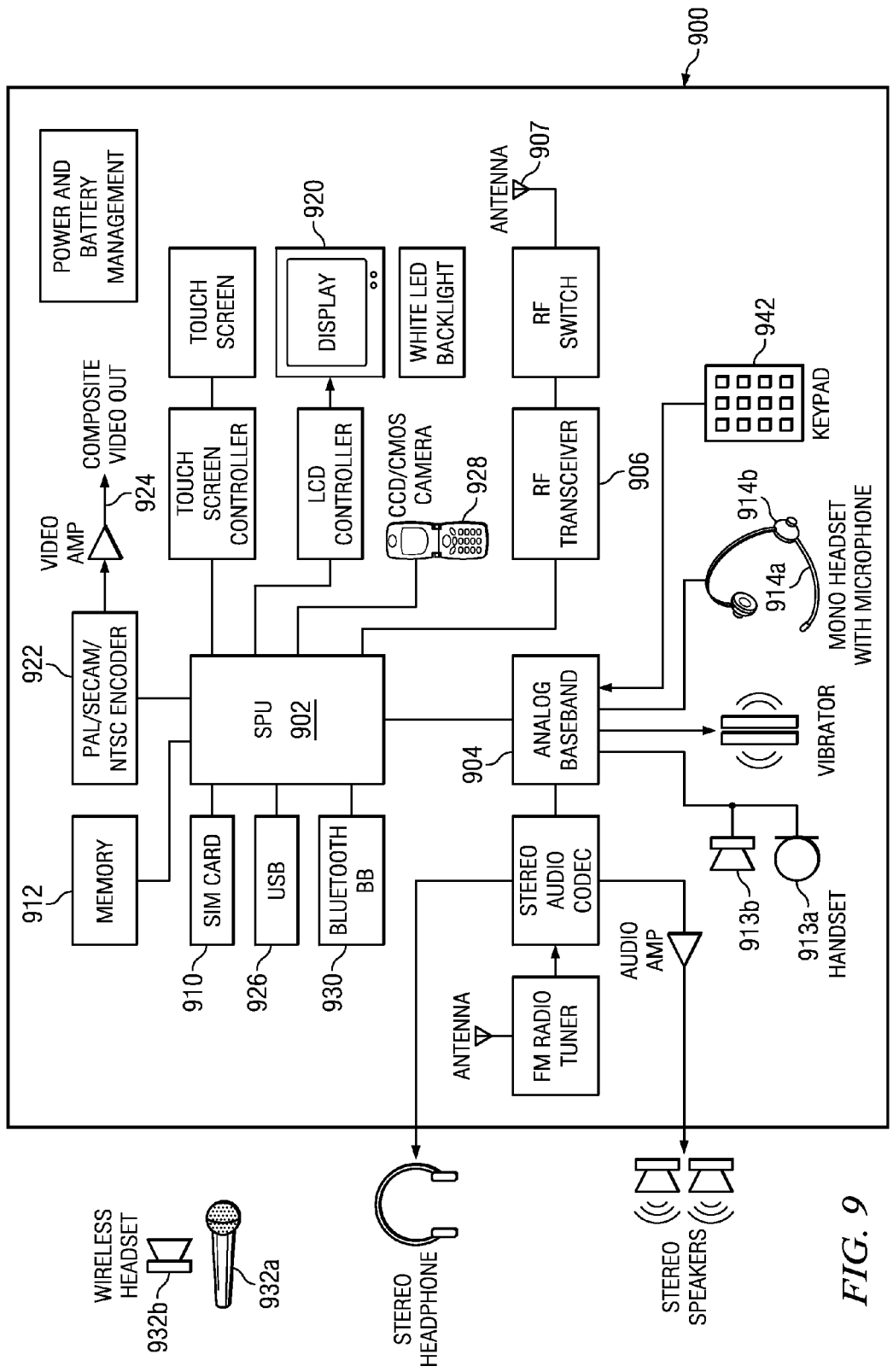

Embodiments of the methods and encoders as described herein may be implemented for virtually any type of digital system (e.g., a desk top computer, a laptop computer, a handheld device such as a mobile (i.e., cellular) phone, a personal digital assistant, a digital camera, etc.). FIGS. 8-10 show block diagrams of illustrative digital systems.

FIG. 8 shows a digital system suitable for an embedded system (e.g., a digital camera) in accordance with one or more embodiments of the invention that includes, among other components, a DSP-based image coprocessor (ICP) (802), a RISC processor (804), and a video processing engine (VPE) (806) that may be configured to perform methods as described herein. The RISC processor (804) may be any suitably configured RISC processor. The VPE (806) includes a configurable video processing front-end (Video FE) (808) input interface used for video capture from imaging peripherals such as image sensors, video decoders, etc., a configurable video processing back-end (Video BE) (810) output interface used for display devices such as SDTV displays, digital LCD panels, HDTV video encoders, etc, and memory interface (824) shared by the Video FE (808) and the Video BE (810). The digital system also includes peripheral interfaces (812) for various peripherals that may include a multimedia card, an audio serial port, a Universal Serial Bus (USB) controller, a serial port interface, etc.

The Video FE (808) includes an image signal processor (ISP) (816), and a 3A statistic generator (3A) (818). The ISP (816) provides an interface to image sensors and digital video sources. More specifically, the ISP (816) may accept raw image/video data from a sensor (CMOS or CCD) and can accept YUV video data in numerous formats. The ISP (816) also includes a parameterized image processing module with functionality to generate image data in a color format (e.g., RGB) from raw CCD/CMOS data. The ISP (816) is customizable for each sensor type and supports video frame rates for preview displays of captured digital images and for video recording modes. The ISP (816) also includes, among other functionality, an image resizer, statistics collection functionality, and a boundary signal calculator. The 3A module (818) includes functionality to support control loops for auto focus, auto white balance, and auto exposure by collecting metrics on the raw image data from the ISP (816) or external memory.

The Video BE (810) includes an on-screen display engine (OSD) (820) and a video analog encoder (VAC) (822). The OSD engine (820) includes functionality to manage display data in various formats for several different types of hardware display windows and it also handles gathering and blending of video data and display/bitmap data into a single display window before providing the data to the VAC (822) in YCbCr format. The VAC (822) includes functionality to take the display frame from the OSD engine (820) and format it into the desired output format and output signals required to interface to display devices. The VAC (822) may interface to composite NTSC/PAL video devices, S-Video devices, digital LCD devices, high-definition video encoders, DVI/HDMI devices, etc.

The memory interface (824) functions as the primary source and sink to modules in the Video FE (808) and the Video BE (810) that are requesting and/or transferring data to/from external memory. The memory interface (824) includes read and write buffers and arbitration logic.

The ICP (802) includes functionality to perform the computational operations required for video encoding and other processing of captured images. The video encoding standards supported may include one or more of the JPEG standards, the MPEG standards, and the H.26x standards. In one or more embodiments of the invention, the ICP (802) is configured to perform computational operations of methods for prediction mode dependent transform coding and decoding as described herein.

In operation, to capture a video sequence, video signals are received by the video FE (808) and converted to the input format needed to perform video encoding. The video data generated by the video FE (808) is stored in then stored in external memory. The video data is then encoded by a video encoder and stored in external memory and/or on a peripheral storage device via one of the peripheral interfaces (812). During the encoding, prediction mode dependent transform coding as described herein may be used. The encoded video data may then be read from the external memory or the peripheral storage device, decoded, and post-processed by the video BE (810) to display the video sequence. During the decoding, prediction mode dependent transform decoding as described herein may be used.

FIG. 9 is a block diagram of a digital system (e.g., a mobile cellular telephone) (900) that may be configured to use prediction mode dependent transform coding and/or decoding as described herein. The signal processing unit (SPU) (902) includes a digital signal processing system (DSP) that includes embedded memory and security features. The analog baseband unit (904) receives a voice data stream from handset microphone (913a) and sends a voice data stream to the handset mono speaker (913b). The analog baseband unit (904) also receives a voice data stream from the microphone (914a) and sends a voice data stream to the mono headset (914b). The analog baseband unit (904) and the SPU (902) may be separate ICs. In many embodiments, the analog baseband unit (904) does not embed a programmable processor core, but performs processing based on configuration of audio paths, filters, gains, etc being setup by software running on the SPU (902).

The display (920) may also display pictures and video sequences received from a local camera (928), or from other sources such as the USB (926) or the memory (912). The SPU (902) may also send a video sequence to the display (920) that is received from various sources such as the cellular network via the RF transceiver (906) or the camera (926). The SPU (902) may also send a video sequence to an external video display unit via the encoder unit (922) over a composite output terminal (924). The encoder unit (922) may provide encoding according to PAL/SECAM/NTSC video standards.

The SPU (902) includes functionality to perform the computational operations required for video encoding and decoding. The video encoding standards supported may include, for example, one or more of the JPEG standards, the MPEG standards, and the H.26x standards. In one or more embodiments of the invention, the SPU (902) is configured to perform computational operations of prediction mode dependent transform coding and/or decoding as described herein. Software instructions implementing the transform coding and/or decoding may be stored in the memory (912) and executed by the SPU (902), for example, as part of encoding video sequences captured by the local camera (928) and/or as part of decoding a received video sequence.

FIG. 10 shows a digital system (1000) (e.g., a personal computer) that includes a processor (1002), associated memory (1004), a storage device (1006), and numerous other elements and functionalities typical of digital systems (not shown). In one or more embodiments of the invention, a digital system may include multiple processors and/or one or more of the processors may be digital signal processors. The digital system (1000) may also include input means, such as a keyboard (1008) and a mouse (1010) (or other cursor control device), and output means, such as a monitor (1012) (or other display device). Those skilled in the art will appreciate that the input and output means may take other forms. The digital system (1000) may also include an image capture device (not shown) that includes circuitry (e.g., optics, a sensor, readout electronics) for capturing video sequences. The digital system (1000) may include an embodiment of a video encoder as described herein for encoding the captured video sequences. The digital system (1000) may be connected to a network (1014) (e.g., a local area network (LAN), a wide area network (WAN) such as the Internet, a cellular network, any other similar type of network and/or any combination thereof) via a network interface connection (not shown). Encoded video sequences may be received by the digital system (1000) via the network and/or via a computer readable medium. The digital system (1000) may include an embodiment of a video decoder as described herein for decoding the encoded video sequences.

Further, those skilled in the art will appreciate that one or more elements of the aforementioned digital system (1000) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (1000) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. For example, in some embodiments, the approximations of single directional transform matrices may be used when determining the spatial prediction mode to be used for a prediction block, and once the spatial prediction mode is determined, the single directional transform matrix for that mode may be used for performing the block transform. In another example, the use of the single directional transform matrices and the approximations may be combined. That is, block transforms for some prediction modes may use the single directional, transform matrices, and for other prediction modes, the block transforms may use the approximations of the single directional transform matrices. Accordingly, the scope of the invention should be limited only by the attached claims. It is therefore contemplated that the appended claims will cover any such modifications of the embodiments as fall within the true scope and spirit of the invention.

What is claimed is:

1. A method of intra-coding blocks of pixels in a digital video sequence, the method comprising:
   selecting a block transform of a plurality of block transforms according to a spatial prediction mode used in generating a block of pixel residual values from a block of pixels, wherein the block transform is based on a single directional transform matrix predetermined for the spatial prediction mode and is a same size as the block of pixel values, wherein the single directional transform matrix for carrying out a directional transform;
   applying the block transform to the block of pixel residual values to generate transform coefficients of the residual pixel values, wherein applying the block transform comprises computing a product of a sparse matrix, a DCT matrix, the block of pixel residual values, a transpose of the DCT matrix, and a transpose of the sparse matrix, wherein the sparse matrix is derived from the single directional transform matrix; and
   entropy coding the generated transform coefficients.

2. The method of claim 1, wherein applying the block transform further comprises:
   computing a product of the directional transform matrix, the block of pixel residual values, and a transpose of the directional transform matrix to generate the transform coefficients.

3. The method of claim 2, wherein each of the plurality of block transforms is associated with at least one spatial prediction mode, and each of the plurality of block transforms is a single directional transform matrix predetermined for the at least one associated spatial prediction mode.

4. The method of claim 1, further comprising:
   selecting the block transform according to another spatial prediction mode used in generating another block of pixel residual values from another block of pixels; and
   applying the block transform to the another block of pixel residual values.

5. The method of claim 1, wherein the sparse matrix is one selected from a group consisting of a diagonal matrix and a rotational matrix.

6. The method of claim 1, wherein each of the plurality of block transforms is associated with at least one spatial prediction mode, and each of the plurality of block transforms is a predetermined sparse matrix derived from a single directional transform matrix predetermined for the at least one associated spatial prediction mode.

7. A video encoder configured to intra-code blocks of pixels in a digital video sequence, the video encoder comprising:
   a transform component configured to
      select a block transform of a plurality of block transforms according to a spatial prediction mode used in generating a block of pixel residual values from a block of pixels, wherein the block transform is based on a single directional transform matrix predetermined for the spatial prediction mode and is a same size as the block of pixel values, wherein the single directional transform matrix for carrying out a directional transform; and
      apply the block transform to the block of pixel residual values to generate transform coefficients of the residual pixel values, wherein applying the block transform comprises computing a product of a sparse matrix, a DCT matrix, the block of pixel residual values, a transpose of the DCT matrix, and a transpose of the sparse matrix, wherein the sparse matrix is derived from the single directional transform matrix; and
   an entropy encoding component configured to entropy code the generated transform coefficients.

8. The video encoder of claim 7, wherein the transform component is further configured to apply the block transform by computing a product of the single directional transform matrix, the block of pixel residual values, and a transpose of the single directional transform matrix to generate the transform coefficients.

9. The video encoder of claim 8, wherein the transform component is further configured to store the plurality of block transforms, and wherein each of the plurality of block transforms is associated with at least one spatial prediction mode, and each of the plurality of block transforms is a single directional transform matrix predetermined for the at least one associated spatial prediction mode.

10. The video encoder of claim 8, wherein the transform component is further configured to:
select the block transform according to another spatial prediction mode used in generating another block of pixel residual values from another block of pixels; and
apply the block transform to the another block of pixel residual values.

11. The video encoder of claim 7, wherein the sparse matrix is one selected from a group consisting of a diagonal matrix and a rotational matrix.

12. The video encoder of claim 7, wherein the transform component is further configured to store the plurality of block transforms, and wherein each of the plurality of block transforms is associated with at least one spatial prediction mode, and each of the plurality of block transforms is a predetermined sparse matrix derived from a single directional transform matrix predetermined for the at least one associated spatial prediction mode.

13. A digital system configured to intra-code blocks of pixels in a digital video sequence the digital system comprising:
means for selecting a block transform of a plurality of block transforms according to a spatial prediction mode used in generating a block of pixel residual values from a block of pixels, wherein the block transform is based on a single directional transform matrix predetermined for the spatial prediction mode and is a same size as the block of pixel values, wherein the single directional transform matrix for carrying out a directional transform;
means for applying the block transform to the block of pixel residual values to generate transform coefficients of the residual pixel values, wherein the means for applying the block transform comprises a means for computing a product of a sparse matrix, a DCT matrix, the block of pixel residual values, a transpose of the DCT matrix, and a transpose of the sparse matrix, wherein the sparse matrix is derived from the single directional transform matrix; and
means for entropy coding the generated transform coefficients.

14. The digital system of claim 13, wherein the means for applying the block transform comprises:
means for computing a product of the single directional transform matrix, the block of pixel residual values, and a transpose of the single directional transform matrix to generate the transform coefficients.

15. The digital system of claim 14, wherein each of the plurality of block transforms is associated with at least one spatial prediction mode, and each of the plurality of block transforms is a single directional transform matrix predetermined for the at least one associated spatial prediction mode.

16. The digital system of claim 13, further comprising:
means for selecting the block transform according to another spatial prediction mode used in generating another block of pixel residual values from another block of pixels; and
means for applying the block transform to the another block of pixel residual values.

17. The digital system of claim 13, wherein each of the plurality of block transforms is associated with at least one spatial prediction mode, and each of the plurality of block transforms is a predetermined sparse matrix derived from a single directional transform matrix predetermined for the at least one associated spatial prediction mode.

* * * * *